US011341068B2

(12) United States Patent
Ramm et al.

(10) Patent No.: US 11,341,068 B2
(45) Date of Patent: May 24, 2022

(54) INTERFACE MODULE AND METHOD FOR CONFIGURING AND PARAMETERIZING A FIELD BUS USER (71) Applicant: Siemens Aktiengesellschaft, Munich (DE)

(72) Inventors: Enrico Ramm, Chemnitz (DE); Dirk Schneider, Lichtentanne (DE); Tobias Weber, Limbach-Oberfrohna (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/166,355

(22) Filed: Feb. 3, 2021

(65) Prior Publication Data
US 2021/0240643 A1 Aug. 5, 2021

(30) Foreign Application Priority Data

Feb. 4, 2020 (EP) ..................................... 20155390

(51) Int. Cl.
*G06F 13/20* (2006.01)
*G06F 9/445* (2018.01)
(Continued)

(52) U.S. Cl.
CPC .......... *G06F 13/20* (2013.01); *G06F 9/44505* (2013.01); *G06F 12/10* (2013.01); *G06F 2212/657* (2013.01)

(58) Field of Classification Search
CPC ................ H04L 29/06; H04L 29/08
See application file for complete search history.

(56) References Cited

U.S. PATENT DOCUMENTS 9,170,578 B2 * 10/2015 Lessmann .......... G05B 19/0423
2010/0039952 A1 * 2/2010 Lenz ...................... G06Q 10/06
370/252
(Continued)

FOREIGN PATENT DOCUMENTS

EP 1697802 9/2006
WO 2015066745 5/2015

OTHER PUBLICATIONS

EP Search Report dated Jun. 24, 2020 based on EP20155390 filed Feb. 4, 2020.

*Primary Examiner* — Getente A Yimer
(74) *Attorney, Agent, or Firm* — Cozen O'Conner (57) ABSTRACT Interface module and method for configuring and parameterizing a field bus user, wherein to facilitate a configuration and parameterization of a field bus user logical addresses on the side of an engineering system are transformed with a transformation device into virtual addresses, where whether virtual addresses are present in a received virtual configuration file is recognized in an interface module via a recognition device, a signal is triggered when addresses are present in the received virtual configuration file to ensure the virtual configuration file is adopted and stored in a non-volatile manner in a configuration store within the interface module, and where the virtual addresses are transformed in the interface module via a reverse transformation device back into physically present addresses, whereby for a data exchange of the process data of the module slot, on request by further field bus users, the process data in the module slot is addressed.

10 Claims, 4 Drawing Sheets (51) Int. Cl.
*G06F 12/10* (2016.01)
*G05B 19/042* (2006.01)

(56) References Cited

U.S. PATENT DOCUMENTS

| | | | |
|---|---|---|---|
| 2013/0275566 A1* | 10/2013 | Huth | H04L 41/0803 |
| | | | 709/220 |
| 2014/0341220 A1* | 11/2014 | Lessmann | H04L 45/741 |
| | | | 370/392 |
| 2016/0318714 A1 | 11/2016 | Reischl | |
| 2017/0331929 A1* | 11/2017 | Zielinski | H04L 69/18 |
| 2018/0139062 A1* | 5/2018 | Alley | H04L 12/10 |

\* cited by examiner

INTERFACE MODULE AND METHOD FOR CONFIGURING AND PARAMETERIZING A FIELD BUS USER

BACKGROUND OF THE INVENTION

1. Field of the Invention

The invention relates to a method for configuring and parameterizing a field bus user that is connected via an interface module to a field bus and that is linked to an engineering system, where the engineering system comprises a configuration tool, with which for the field bus user with at least one module slot for the connection of sensors and/or actuators, logical addresses for the accessing of process data of the sensors and/or actuators are issued in a configuration file and where, via the configuration tool, an application relation is at least temporarily created between the engineering system and the interface module.

The invention also relates to an interface module for a field bus user comprising a connection for a field bus, at least one module slot for the connection of sensors and/or actuators, a configuration store for storing a configuration file with logical addresses for accessing process data of the sensors and/or actuators, a firmware infrastructure for establishing a Profinet connection on the basis of a Profinet-I/O connection.

The starting point for the invention is a peripheral system with a field bus interface connected, via an interface module, to the Profinet communication module slots for electronic modules are referenced that are addressed via the Profinet slot model. (See, e.g., explanation regarding the Profinet I/O device model, for example, at Feldbusse.de).

2. Description of the Related Art

For use of the aforementioned peripheral system in an environment without a Profinet controller, e.g., for Ethernet/IP or Modbus TCP/IP, there is the necessity to store a configuration and parameterization of the peripheral system in the same in a non-volatile manner, because this information is not necessarily part of a connection establishment of a non-Profinet controller.

SUMMARY OF THE INVENTION

It is an object of the invention to provide a simple, flexible and powerful method for transferring and storing the information for configuring and parameterizing a peripheral system.

This and other objects and advantages are achieved in accordance with the invention by a method in which the logical addresses on the side of an engineering system are transformed with a transformation device into virtual addresses that are not physically present and thereby a transformed virtual configuration file comes into existence that is transmitted via the field bus with the aid of the application relation to the interface module, wherein a determination of whether virtual addresses are present in the received virtual configuration file is performed by a recognition device within the interface module such that, when virtual addresses are recognized a being present in the received virtual configuration file, a signal is triggered to ensures that the virtual configuration file is adopted and stored in a non-volatile manner in a configuration store within the interface module and, additionally, the virtual addresses are transformed within the interface module via a reverse transformation device back into physically present addresses, i.e., the logical addresses, whereby for a data exchange of the process data of the module slot, on a request by further field bus users, the process data in the module slot is addressed.

It is regarded as a particular advantage of the invention that for the recognition of a download connection with configuration and parameterization data of the slots or slot numbers to be configured, only a virtual slot number range is now given, where the real addresses are displaced into the virtual slot number range that lies beyond the physical module slots and can be stipulated device-specifically. The field bus driver of the field bus user or of the interface module now recognizes that, based upon the configuration file sent to it, virtual slot numbers or virtual addresses are present in this file. This is the signal for the interface module or the field bus user that this data packet is intended for it and describes a configuration for the interface module or field bus user. The interface module can thereafter store this data in the configuration store in a non-volatile manner. For communication between the users, for example, between an engineering system and an interface module, there initially exists an application relation (AR). This is usually inherently provided by the mechanisms of the Profinet protocol stack. In an AR, a plurality of communication relations (CR) can be created. These are unambiguously referenced by a frame ID and by an Ethernet user. The most important types of communication relations are: acyclic data traffic AC (record data) (always established first), I/O-CR for the cyclic transfer of I/O data, alarm-CR for the acyclic transfer of events. During the establishment of an I/O-CR (connect sequence), the following agreements are stipulated: frame ID, data elements that are to be transferred, sequence of the frames, and/or transfer cycle of the frames.

With a firmware infrastructure in the peripheral system that is present in Profinet devices, a basic mechanism is available for establishing a Profinet connection, via which Profinet-/O connections can be established.

Advantageously thereafter, a project download (transmission of the configuration file) from the engineering system or the configuration tool to the respective field bus user via a firmware infrastructure inherently present for the field bus with its connected field bus users for establishing a Profinet connection based on a Profinet-I/O connection is performed.

The peripheral system or, in the following case, the interface module, contain, for their projecting data, a non-volatile memory store, i.e., the configuration store. This memory store can be built in or configured to be exchangeable as a memory card. A device already configured via a memory card could then be exchanged and, in the event of an error, the memory card could be plugged into a replacement device. The data is then automatically accepted by the new replacement device, such that no PG/PC is necessary for the programming in the event of an exchange.

It is further advantageous if at least one of the following components is used in the firmware infrastructure: an Ethernet device driver for the abstraction of the network hardware, a Transmission Control Protocol/Internet Protocol (TCP/IP) stack as the basis for IP and connection-oriented protocols, a Profinet stack in which normalized protocols and data structures are implemented, a Profinet device driver which is used as an adapter to the Profinet stack, and/or a field bus interface manager for connecting various field buses.

According to experience and with respect to the field bus user or interface module, it is advantageous if the field bus user configured and parameterized in this way is operated such that, following a voltage dropout or a restart, it accesses the stored configuration file, transforms it and runs through an initializing phase with the real logical addresses obtained and is then communication-ready again.

It is also and object of the invention to provide an interface module, where the interface module for a field bus user comprises a connection for a field bus, at least one module slot for the connection of sensors and/or actuators, a configuration store for storing a configuration file with logical addresses for accessing process data of the sensors and/or actuators, and a firmware infrastructure for establishing a Profinet connection based on a Profinet-/O connection.

In this regard, the following features contribute to the solution. A recognition device is present which is configured to test a configuration file that was received via an at least temporarily created application relation to whether determine whether the received configuration file has virtual addresses that are not physically present, and is further configured, for the event that virtual addresses are recognized, to trigger a signal and to treat the received configuration file further as a virtual configuration file, and the recognition device is therein further configured to store the virtual configuration file in a configuration store in a non-volatile manner. In addition, a back-transformation device is provided, which is configured to transform the virtual addresses back into physically present addresses, i.e., the logical addresses, whereby for a data exchange of the process data of the module slot on requests from further field bus users, the process data in the module slot is addressed.

A field bus driver in the interface module recognizes configurations of its module slots in slot numbers lying within the virtual number range in the target configuration sent to it and places the configuration data in the configuration store in a non-volatile manner. In addition, the configuration data in the virtual number range is entered into an actual configuration. Based on a simple existing communication type between the Profinet and field bus users, parameterization data sets, i.e., the configuration files for any desired field bus users or interface modules, can be addressed and these can be intercepted by the interface module, because the interface modules recognize, on the basis of the virtual numbers, that this must be a parameterization data set for it.

It is further advantageous that the interface module has a firmware infrastructure with at least one of the following components: An Ethernet device driver for the abstraction of the network hardware, a TCP/IP stack as the basis for IP and connection-oriented protocols, a Profinet stack in which normalized protocols and data structures are implemented, a Profinet device driver which is used as an adapter to the Profinet stack, and/or a field bus interface manager for connecting various field buses.

For operation of the interface modules after a voltage dropout, it is advantageous if the interface module is further configured with an initializing device, where the initializing device is configured such that it accesses the stored configuration file with the virtual addresses after a voltage dropout or a restart and transforms these virtual addresses to the real logical addresses and runs through an initializing phase in order thereafter to be communication-ready again.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings illustrate an exemplary embodiment of the invention, in which.

DETAILED DESCRIPTION OF THE EXEMPLARY EMBODIMENTS

Figure 1:
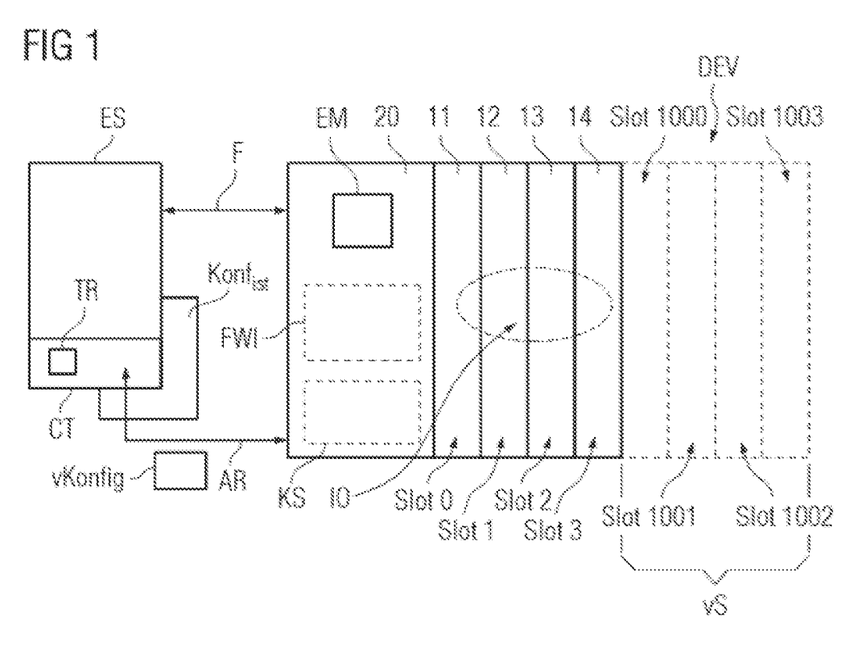
FIG. 1 is a schematic illustration of an overview of a coupling between an engineering system and a peripheral system with an interface module in accordance with the invention.

With reference to FIG. 1, an engineering system ES is shown connected via a field bus F to an interface module 20. The engineering system ES has a configuration tool CT which is configured to permit a configuration and parameterization of field bus users, in particular of multifield bus devices. Such an engineering system ES or the configuration tool CT contained therein is configured to support, for example, a plurality of Profinet-conforming devices, independently of their manufacturers. It is considered an advantage of such multifunctional configuration tools that they form a small effective software packet and permit the configuration of Profinet, or in general, periphery users, in a simple manner without a user having to install a large extensive software packet.

The interface module 20 has a field bus user Dev which, alongside the interface module 20, has a plurality of module slots, specifically a first module slot 11, a second module slot 12, a third module slot 13 and a fourth module slot 14. The module slots 11, 12, 13, 14 also form a slot 0, a slot 1, a slot 2 and a slot 3. The slots 0, . . . , 3 are mappable with real logical addresses IAdr. For accessing process data I/O, via the configuration tool CT for the connection of sensors and/or actuators to the module slots, logical addresses IAdr can be issued for access to the process data of the sensors and/or actuators. An application relation AR is also created at least temporarily by the configuration tool CT between the engineering system ES and the interface module 20. In order to realize a project download or a download of a configuration file $Konf_{ist}$ to a field bus user, in the existing peripheral system, an existing firmware infrastructure FWI (see FIG. 5) is used for establishing a Profinet connection using robust normalized protocols and data structures based on a Profinet-I/O connection for transfer of the configuration and parameterization data.

In order to give to the field bus user Dev or the interface module 20 the possibility of recognizing that a transferred data packet is now intended for it, the logical addresses IAdr are transformed on the side of the engineering system ES with a transformation device TR to virtual addresses vAdr, which are not physically present and, thereby, a transformed virtual configuration file vKonfig is created that is transmitted via the field bus F with the aid of the application relation AR to the interface module 20.

In the interface module 20, with a recognition device EM, whether virtual addresses vAdr are present in the received virtual configuration file vKonfig is recognized, whereby this recognition triggers a signal Si that ensures in the interface module 20 that the virtual configuration file vKonfig is adopted and is stored in a non-volatile manner in a configuration store KS.

Figure 2:
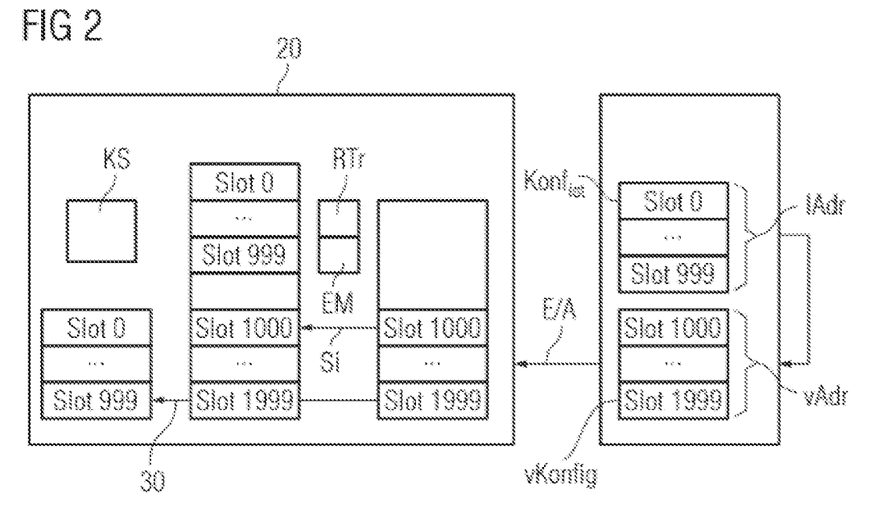
FIG. 2 is a schematic illustration of the transmission of a configuration file via the field bus with the aid of an application relation in accordance with the invention.

This transfer is also represented in FIG. 2, whereby in the engineering system ES, the transformation of real address slot 0, . . . , slot 999 to virtual address slot 1000, . . . , 1999 has been realized. The virtual configuration file vKonfig is now recognized in the interface module 20 via the recognition device EM and is transformed back into real addresses by a back-transformation device RTr. This is triggered via the signal Si. The step 30 of transforming and storing shows that it is placed in a project store and finally in the configuration store KS in a non-volatile manner.

Figure 3:
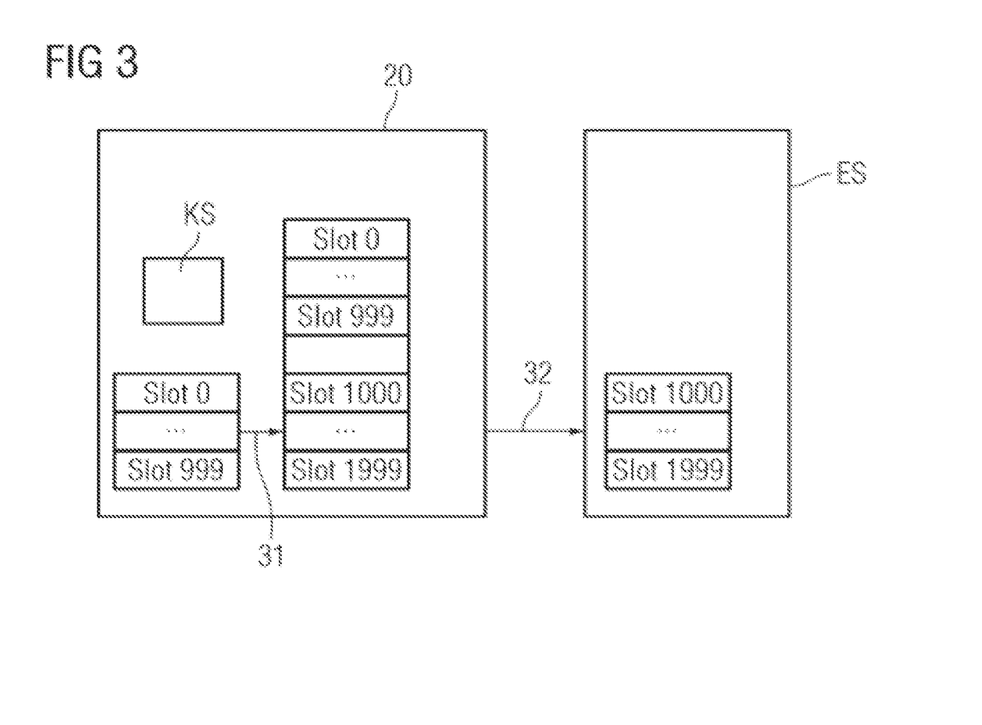
FIG. 3 is a schematic illustration of the reading out of a configuration file from the interface module in accordance with the invention.

In FIG. 3, the reverse route is shown and from the interface module 20 by way of step 31, transformation from "the device viewpoint", a configuration file with virtual addresses vAdr is created which is read via a reading step 32 by the engineering system ES.

Figure 4:
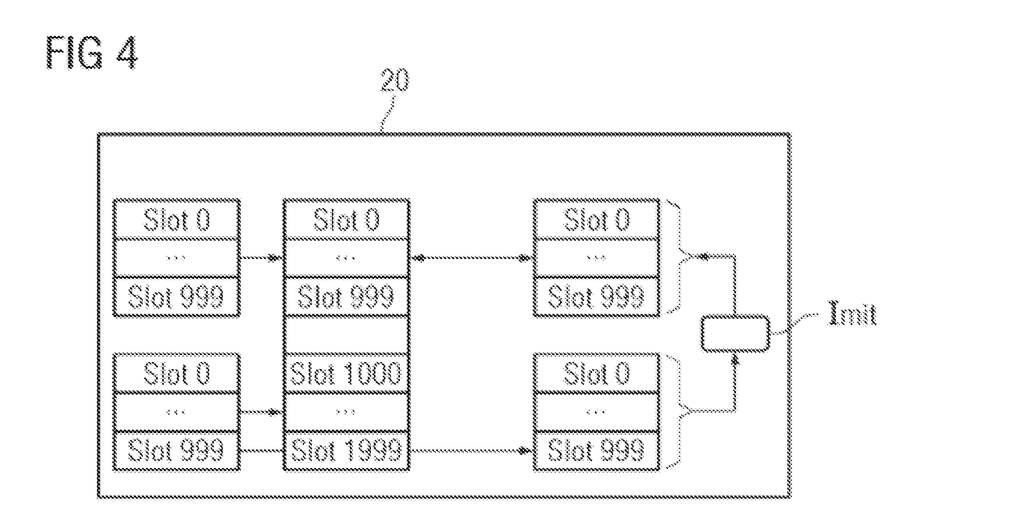
FIG. 4 is a schematic illustration of a self-start of an interface module in accordance with the invention.

FIG. 4 shows how an interface module 20 is itself newly parameterized with the aid of an initializing device Init after a voltage dropout or after a restart with the aid of the stored virtual configuration file vKonf in order to be communication-ready again after an initializing phase.

Figure 5:
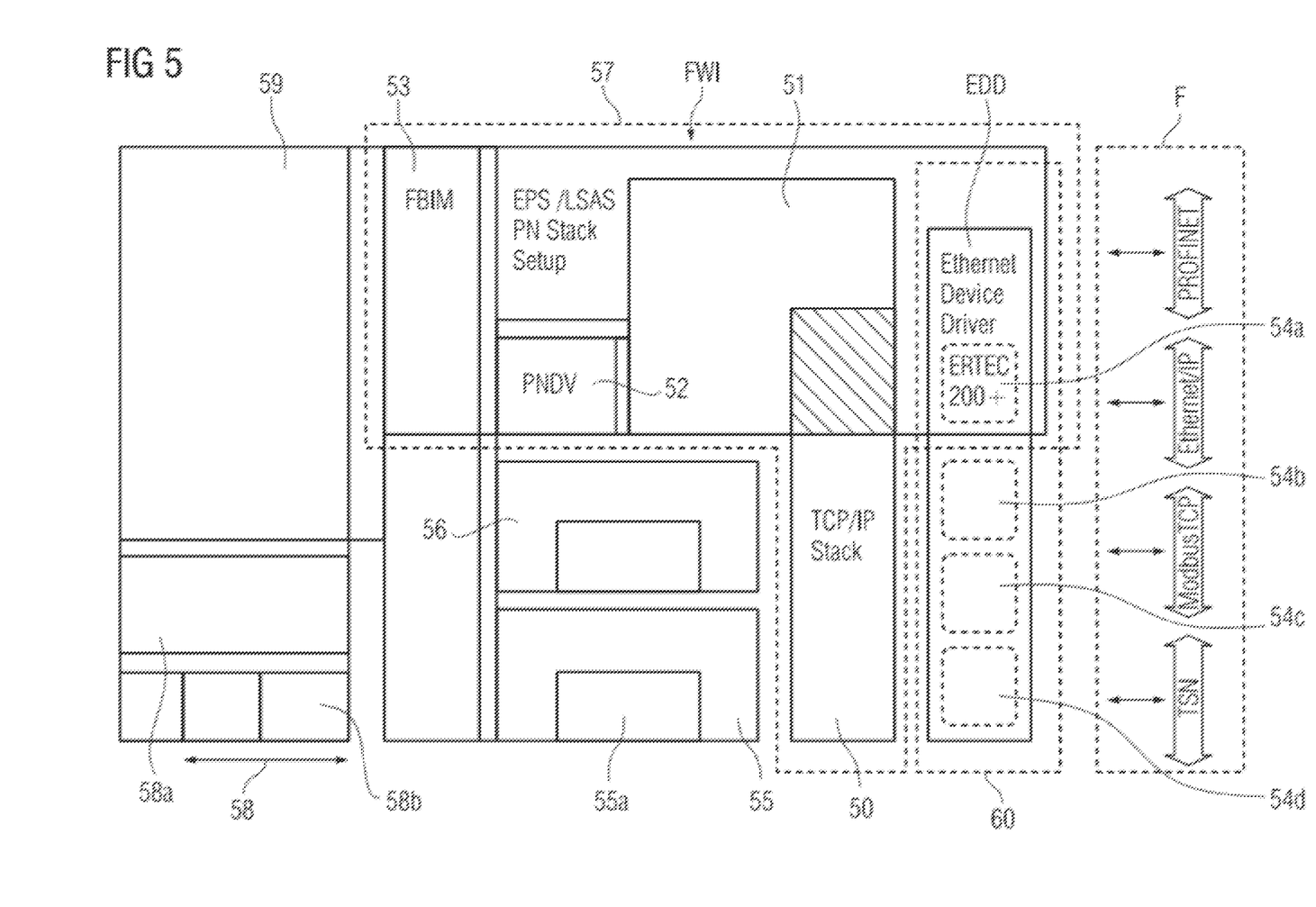
FIG. 5 is schematic illustration of an assembly of drivers, Profinet mechanisms, protocols and communication stacks in accordance with the invention.

FIG. 5 shows a software architecture with a plurality of drivers, Profinet stacks, hardware platforms, Ethernet stacks and backplane bus coupling, and hereby from this totality, the aforementioned firmware infrastructure FWI is used as a basic set 57. As used, this firmware infrastructure FWI comprises the components which lie within the dashed line, being a field bus manager 53 FBIM, a Profinet stack 51, a TCP/IP stack 50, an Ethernet device driver EDD of an Ethernet ASIC for Profinet I/O 54*a*, here in particular an ERTEC 200+. In addition, a first chip 54 for any desired SOC (system on chip), a second chip 54*c* for any further desired SOC and/or a third chip 54*d*, for example, for a TSN driver, can also be present in the Ethernet device driver unit EDD. The chips mentioned are identified with the rectangular interwoven line as a hardware platform 60. The field bus F connected to the hardware platform 60 could be configured as a Profinet, an Ethernet/IP, a Modbus TCP/IP TCP or a TSN field bus.

In addition, the architecture shown has an Ethernet/IP device driver 56 and a Modbus driver 55 with a Modbus stack 55*a*. For a general device application, a device application 59 for the interface module 20 is present. A backplane bus interface 58*a* permits access, via a special coupler 58*b*, access to a backplane bus 58, for example, to the decentralized peripheral devices of the Simatic ET200 group. For further explanation, reference is made in the following to the addressing of the I/O data.

Addressing the I/O Data

The slot denotes the physical plug-in slot of a peripheral assembly in a modular I/O field device in which a module described in the GSD file is placed. On the basis of the different slots, the projected modules are addressed which contain one or more subslots (the actual I/O data) for the data exchange.

Within a slot, the subslots form the actual interface to the process (inputs/outputs). The granularity of a subslot (bit, byte, word-wise distribution of the I/O data) is determined by the manufacturer. The data content of a subslot is always accompanied by an item of status information from which the validity of the data can be derived.

The index specifies the data within a slot/subslot which can be read or written acyclically by means of read/write services. On the basis of an index, for example, parameters can be written to an assembly or manufacturer-specific assembly data can be read out.

The quantity of slots/subslots an I/O device can handle is determined by the manufacturer in the definitions in the GSD file. The addressing of the cyclical I/O data takes place by means of the specification of the slot/subslot combination. This can be freely defined by the manufacturer.

In the case of acyclical data traffic via read/write services, an application can exactly specify the data to be addressed with slot and subslot. For the need-oriented data exchange, the third addressing level, the index, is added thereto. The index defines the function that is to be triggered by the slot/subslot combination (e.g. reading the input data of a subslot, reading the I&M functions, reading the setpoint/actual configuration).

Figure 6:
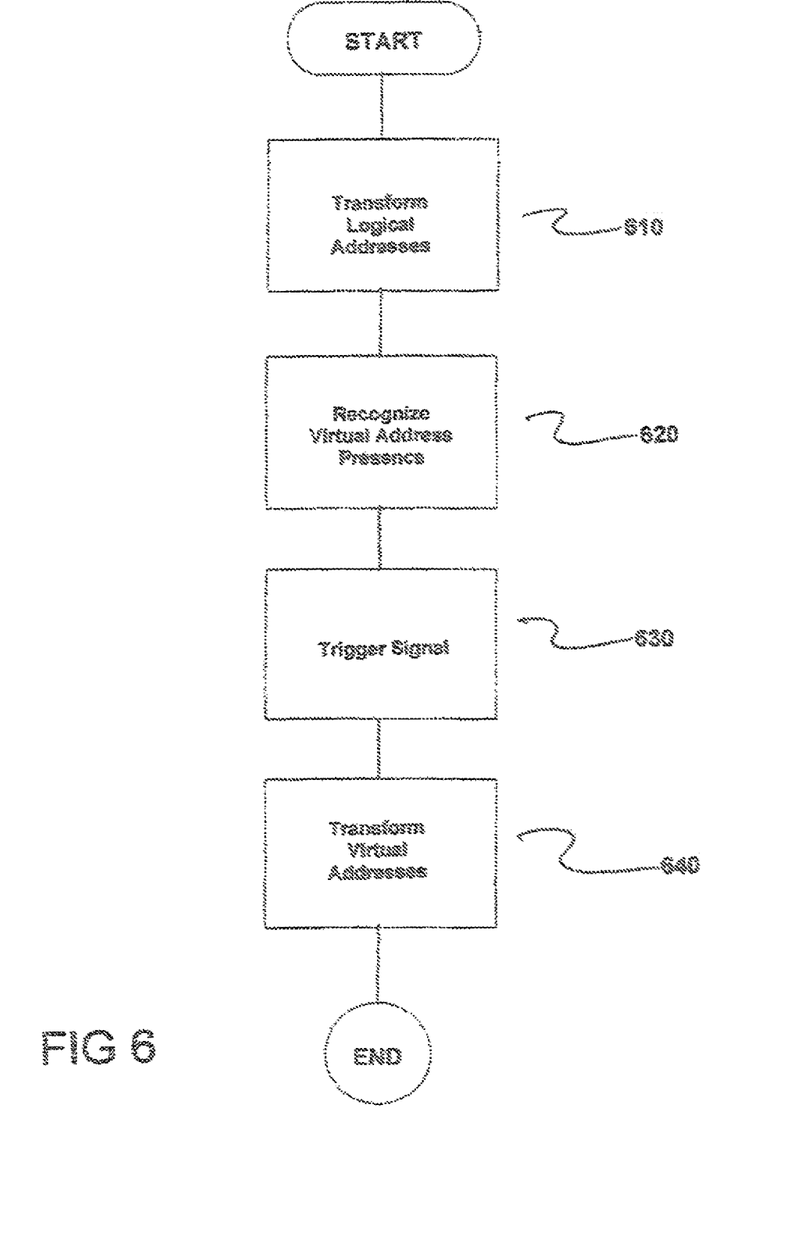
FIG. 6 is a flowchart of the method in accordance with the invention.

FIG. 6 is a flowchart of the method for configuring and parameterizing a field bus user Dev that is connected via an interface module 20 to a field bus F and that is linked to an engineering system ES comprising a configuration tool CT, with which for the field bus user Dev with at least one module slot 11 for connection of sensors and/or actuators, logical addresses IAdr for accessing process data 10 of the sensors and/or actuators are issued in a configuration file Konf$_{ist}$ and, via the configuration tool CT, an application relation AR is at least temporarily created between the engineering system ES and the interface module 20. The method comprises transforming the logical addresses IAdr on a side of the engineering system ES with a transformation device TR into virtual addresses vAdr which are not physically present such that, a transformed virtual configuration file vKonfig comes into existence, which is transmitted via the field bus F to the interface module 20 aided by the application relation AR, as indicated in step 610.

Next, whether the virtual addresses vAdr are present in the received virtual configuration file vKonfig is recognized in the interface module 20, via a recognition device EM, as indicated in step 620.

Next, a signal Si is triggered upon recognizing that the virtual addresses vAdr are present in the received virtual configuration file vKonfig to ensure that the virtual configuration file (vKonfig) is adopted and is stored in a non-volatile manner in a configuration store KS within the interface module 20, as indicated in step 630.

Next, the virtual addresses vAdr are transformed in the interface module 20 via a reverse transformation device RTr back into physically present addresses comprising the logical addresses IAdr, whereby for a data exchange of the process data IO of the module slot 11, on a request by further field bus users, the process data IO in the module slot 11 is addressed, as indicated in step 640.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring and parameterizing a field bus user which is connected via an interface module to a field bus and which is linked to an engineering system comprising a configuration tool, with which for the field bus user with at least one module slot for connection of at least one of sensors and actuators, logical addresses for accessing process data of at least one of the sensors and actuators are issued in a configuration file and, via the configuration tool, an application relation is at least temporarily created between the engineering system and the interface module, the method comprising:

transforming the logical addresses on a side of the engineering system with a transformation device into virtual addresses which are not physically present such that, a transformed virtual configuration file comes into existence, which is transmitted via the field bus to the interface module aided by the application relation;

recognizing in the interface module, via a recognition device, whether the virtual addresses are present in the received virtual configuration file;

triggering a signal upon recognizing that the virtual addresses are present in the received virtual configuration file to ensure that the virtual configuration file is adopted and is stored in a non-volatile manner in a configuration store within the interface module; and transforming the virtual addresses in the interface module via a reverse transformation device back into physically present addresses comprising the logical addresses, whereby for a data exchange of the process data of the module slot, on a request by further field bus users, the process data in the module slot is addressed.

2. The method as claimed in claim 1, further comprising:
downloading a project download from the engineering system or the configuration tool to the respective field bus user via a firmware infrastructure inherently existing for the field bus with its connected field bus users to establish a Profinet connection based a Profinet-I/O connection.

3. The method as claimed in claim 2, wherein at least one of the following components is utilized in the firmware infrastructure:
an Ethernet device driver for the abstraction of the network hardware,
a TCP/IP stack as the basis for IP-oriented and connection-oriented protocols,
a Profi-stack in which normalized protocols and data structures are implemented,
a Profinet device driver, which is used as an adapter to the Profinet stack, and
a field bus interface manager for linking different field buses.

4. The method as claimed in claims 1 to 3, wherein a configured and parameterized field bus user is operated such that, following the voltage dropout or the restart, said configured and parameterized field bus user accesses the stored configuration file, transforms said accessed and stored configuration file and runs through an initializing phase with the real logical addresses obtained, said configured and parameterized field bus user being then again communication-ready.

5. The method as claimed in claim 2, wherein a configured and parameterized field bus user is operated such that, following the voltage dropout or the restart, said configured and parameterized field bus user accesses the stored configuration file, transforms said accessed and stored configuration file and runs through an initializing phase with the real logical addresses obtained, said configured and parameterized.

6. The method as claimed in claim 3, wherein a configured and parameterized field bus user is operated such that, following the voltage dropout or the restart, said configured and parameterized field bus user accesses the stored configuration file, transforms said accessed and stored configuration file and runs through an initializing phase with the real logical addresses obtained, said configured and parameterized.

7. An interface module for a field bus user, comprising:
a connection for a field bus;
at least one module slot for connection of at least one of sensors and actuators;
a configuration store for storing a configuration file with logical addresses for accessing process data of at least one of the sensors and actuators;
a firmware infrastructure for establishing a Profinet connection based on a Profinet-I/O connection;
a recognition device which is configured to test a configuration file, which was received via an at least temporarily created application relation whether said a configuration file includes virtual addresses which are not physically present, and is further configured, for an event that virtual addresses have been recognized, to trigger a signal and to treat the received configuration file further as a virtual configuration file, and the recognition device being further configured to store the virtual configuration file in a configuration store in a non-volatile manner; and
a reverse transformation device which is configured to transform the virtual addresses back into physically present addresses comprising the logical addresses, whereby for a data exchange of the process data of the module slot, on a request by further field bus users, the process data in the module slot is addressed.

8. The interface module as claimed in claim 7, further comprising:
a firmware infrastructure which includes at least one of:
an Ethernet device driver for abstraction of the network hardware,
a TCP/IP stack as the basis for IP-oriented and connection-oriented protocols,
a Profinet-stack in which normalized protocols and data structures are implemented,
a Profinet device driver which serves as an adapter to the Profinet stack, and
a field bus interface manager for linking different field buses.

9. The interface module as claimed in claim 7, further comprising:
an initializing device which is configured, following a voltage dropout or a restart, to access the stored configuration file with the virtual addresses, transform said accessed stored configuration file and configured to run through an initializing phase with the obtained real logical addresses in order thereafter to be communication-ready.

10. The interface module as claimed in claim 8, further comprising:
an initializing device which is configured, following a voltage dropout or a restart, to access the stored configuration file with the virtual addresses, transform said accessed stored configuration file and configured to run through an initializing phase with the obtained real logical addresses in order thereafter to be communication-ready.

\* \* \* \* \*